United States Patent
Alse et al.

(10) Patent No.: US 7,673,336 B2
(45) Date of Patent: Mar. 2, 2010

(54) METHOD AND SYSTEM FOR CONTROLLING ACCESS TO DATA COMMUNICATION APPLICATIONS

(75) Inventors: Sridhar Alse, Bangalore (IN); Chandra Mohan Padmati, Bangalore (IN); Gary Sockrider, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 1140 days.

(21) Appl. No.: 11/282,153

(22) Filed: Nov. 17, 2005

(65) Prior Publication Data

US 2007/0168552 A1     Jul. 19, 2007

(51) Int. Cl.
*G06F 9/00* (2006.01)
(52) U.S. Cl. .............................. 726/11; 726/12; 726/13
(58) Field of Classification Search .................. 726/11, 726/12, 13
See application file for complete search history.

(56) References Cited

U.S. PATENT DOCUMENTS

| | | | |
|---|---|---|---|
| 2002/0120853 A1 | 8/2002 | Tyree | |
| 2002/0178230 A1* | 11/2002 | Aggarwal et al. | 709/206 |
| 2003/0079121 A1* | 4/2003 | Gilman et al. | 713/153 |
| 2004/0083382 A1* | 4/2004 | Markham et al. | 713/200 |
| 2005/0182781 A1* | 8/2005 | Bouvet | 707/102 |
| 2007/0033645 A1* | 2/2007 | Jones | 726/12 |

* cited by examiner

*Primary Examiner*—Christopher J Brown
(74) *Attorney, Agent, or Firm*—Trellis IP Law Group, PC (57) ABSTRACT

A method and apparatus for controlling access to data communication applications is disclosed. According to the method, the DNS names of the servers of the data communication applications are identified. The identified DNS names are used to determine the IP addresses of the servers. Furthermore, the identified IP addresses are used to control access to the data communication applications for the requests going to the servers of the data communication applications.

21 Claims, 5 Drawing Sheets

Fig. 5 ments with them. Examples of the network may include a
METHOD AND SYSTEM FOR CONTROLLING ACCESS TO DATA COMMUNICATION APPLICATIONS

BACKGROUND OF THE INVENTION

1. Field of Invention

Various embodiments of the invention relate in general to data communication applications. More specifically, the various embodiments of the invention relate to methods and systems for controlling access to the data communication applications.

2. Description of the Background Art

Examples of the data communication applications may include instant messaging applications, email applications, and the like. Communication of information that is confidential, or can be a reason for unnecessarily overloading the network, should be avoided. This information can be in the form of emails, instant messages, and files transferred by using emails or instant messaging (IM) applications, and voice mails. IM applications can be considered to be commonly abused data communication applications, mainly because of the unavailability of an easily accessible record of data communication taking place among the users. IM provides the ability to easily check whether friends or co-workers are connected to the network, and, if they are, to exchange messages with them. Examples of the network may include a Local Area Network (LAN), a Wide Area Network (WAN), an intranet, an extranet, the Internet, and an enterprise network. IM applications are primarily used for online chatting in the network. However, users can abuse these applications. For example, users in an enterprise may transfer confidential data pertaining to the enterprise, in the form of files, to third parties. Moreover, IM applications are also used for network attacks, and to spread viruses and other security threats on the network.

Conventional techniques, used to control IM applications, include using a stand-alone proxy server through which each IM application running on the network of the enterprise connects. The proxy server is used to define and enforce a security policy on IM applications running in the enterprise. However, using a proxy server is an enterprise-level solution and can be overkill in Small Office Home Office (SOHO)-level networks and other low-end user networks. SOHO-level and low-end user networks need an easy solution to control IM applications.

Other than using the proxy server, conventional techniques include the use of a firewall deployed on a router in the network, which can enforce the security policy on IM applications. The firewall controls the IM applications crossing the boundary of the network, and blocks access to an IM application by using an IP address corresponding to a server of the IM application. Most of the servers of IM applications, hereinafter referred as IM servers, use a set of dynamic IP addresses. Therefore, each query to an IM server of the IM application, hereinafter referred to as a DNS query, results in a different IP address from the set of dynamic IP addresses. Furthermore, the set of dynamic IP addresses can also be changed without prior notice. Therefore, it is difficult to maintain an IP address-based access control list (ACL) in a router, to control access to IM applications.

An IM server can communicate data through a number of ports that is more than the number assigned by the network administrator for data transfer. Moreover, the IM server can communicate the data through many unrelated ports that are allocated to other well-known applications, such as telnet, file transfer protocol (ftp), and simple mail transfer protocol (SMTP). When assigned ports are blocked, clients using the IM server can detect this automatically and can be configured to communicate the data through the unrelated ports assigned to other applications. Hence, the IM server is able to communicate the data through any port that is allowed to pass through the firewall.

Therefore, the mechanisms, as described above, can easily break the existing firewall to communicate data that should not be allowed to travel across the network.

DETAILED DESCRIPTION OF EMBODIMENTS OF THE INVENTION

Various embodiments of the invention provide a method, a system, and a computer program product for controlling access to various data communication applications in a network. According to the various embodiments of the invention, information about the DNS names of the data communication applications is collected. IP addresses corresponding to these data communication applications are then identified, based on the DNS names. After identifying the IP addresses, requests for data transfer, going to the servers of data communication applications, are determined by using identified IP addresses. Access to data communication applications can be controlled for the requests, based on the identified IP addresses.

Figure 1:
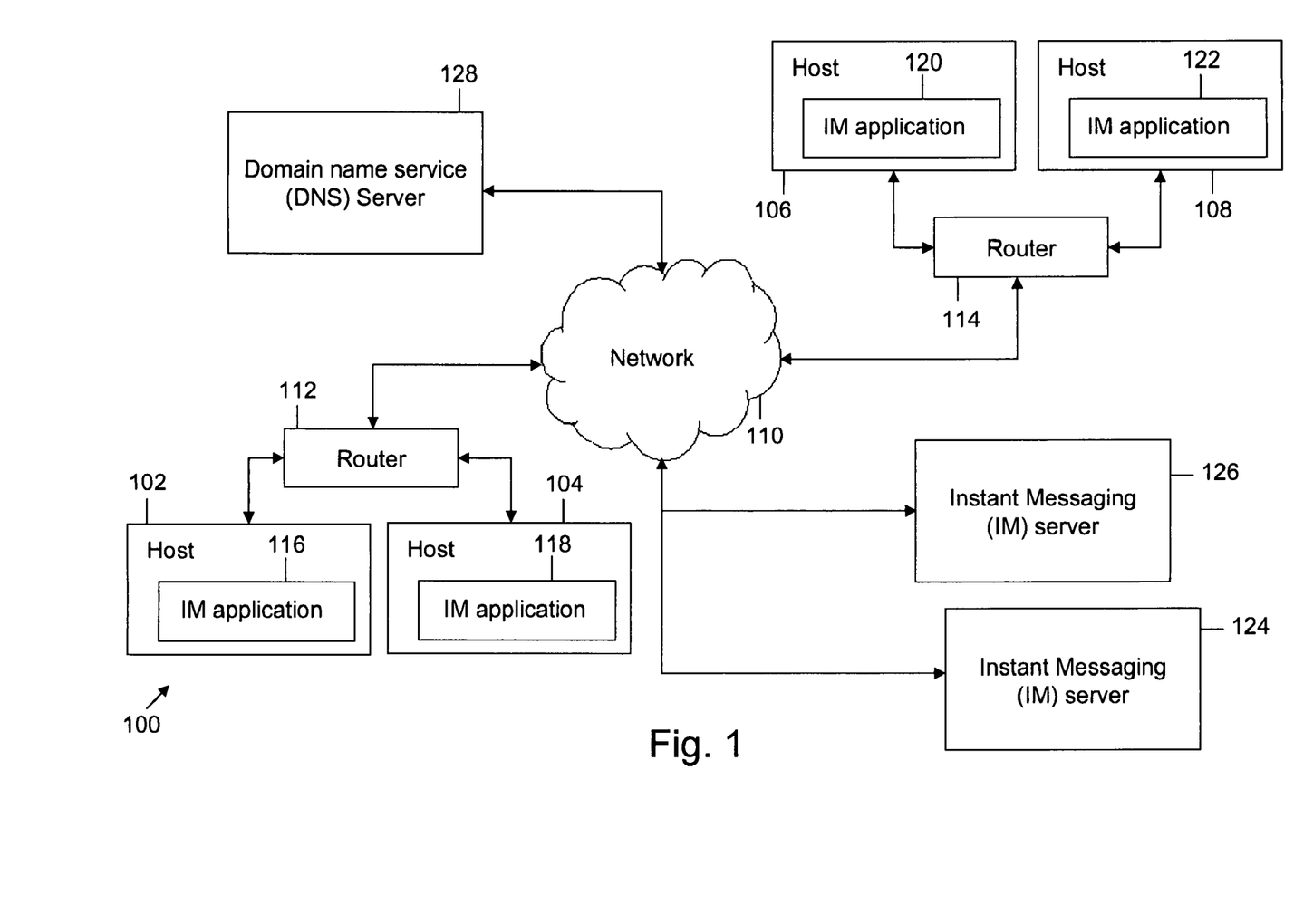
FIG. 1 illustrates a network environment for implementing an exemplary embodiment of the present invention.

FIG. 1 illustrates a network environment 100 for implementing an exemplary embodiment of the invention. In network environment 100, instant messaging applications are used as data communication applications for transfer of data. In accordance with an embodiment of the invention, network environment 100 may include a host 102, a host 104, a host 106, and a host 108. Examples of hosts may include personal computers, laptops, mobile devices and workstations. In accordance with an embodiment of the invention, hosts 102 and 104 can be connected to a network 110 through a router 112. According to various embodiments of the invention, network 110 can be a Local Area Network (LAN), a Wide Area Network (WAN), an intranet, an extranet, the Internet, and an enterprise network. A router can be a device or software in some cases, which can route data transmission in a network. Further, hosts 106 and 108 can be connected to network 110 through a router 114. Each of hosts 102, 104, 106 and 108 can include an instant messaging (IM) application as a data communication application for data transfer in network environment 100. Data transfer can also be performed by emails, voice mails and file transfer, using emails and instant messages. Hosts 102 and 104 can include an IM application 116 and an IM application 118, respectively. Further, hosts 106 and 108 can include an IM application 120 and an IM application 122, respectively. Examples of IM applications include Yahoo Messenger, AIM, AOL ICQ, and Microsoft .NET messenger.

An IM application running in a host can make a request for data transfer to another host through another IM application. If the data to be transferred is unacceptable, a firewall can deny access to the second IM application. Examples of unacceptable data can include the confidential data of an enterprise, which can be transferred to third parties through files attached to emails and instant messages. A firewall is a set of programs that protects the resources of a private network from users of third-party networks. The firewall can examine all the data that is transferred in the network and can determine whether to forward the data to the specified destination. In accordance with an embodiment of the invention, a firewall may be deployed on a router in the network. An example of a firewall is an IOS firewall, provided by Cisco. For example, IM application 116 can communicate with IM application 122. If IM application 116 makes a request for a file transfer to host 108 through IM application 122, the firewall deployed in router 114 can deny access to IM application 122. In accordance with an embodiment of the invention, network environment 100 may also include an IM server 124, an IM server 126, and a domain name service (DNS) server 128. An IM server can be a server of an IM application and can provide resources for running the IM application. For example, IM server 124 can provide resources for running IM applications 116 and 122 in their respective hosts. Further, IM server 126 can provide resources for running IM applications 118 and 120. DNS server 128 can answer queries to identify the Internet protocol (IP) addresses corresponding to the DNS names of IM servers 124 and 126. A query that relates to the identification of an IP address corresponding to the DNS name of an IM server can be called a DNS query. An IM server of an IM application can have multiple IP addresses assigned to it. For example, IM server 124 of IM applications 116 and 122 can have multiple IP addresses, for which DNS queries can be made to DNS server 128.

Figure 2:
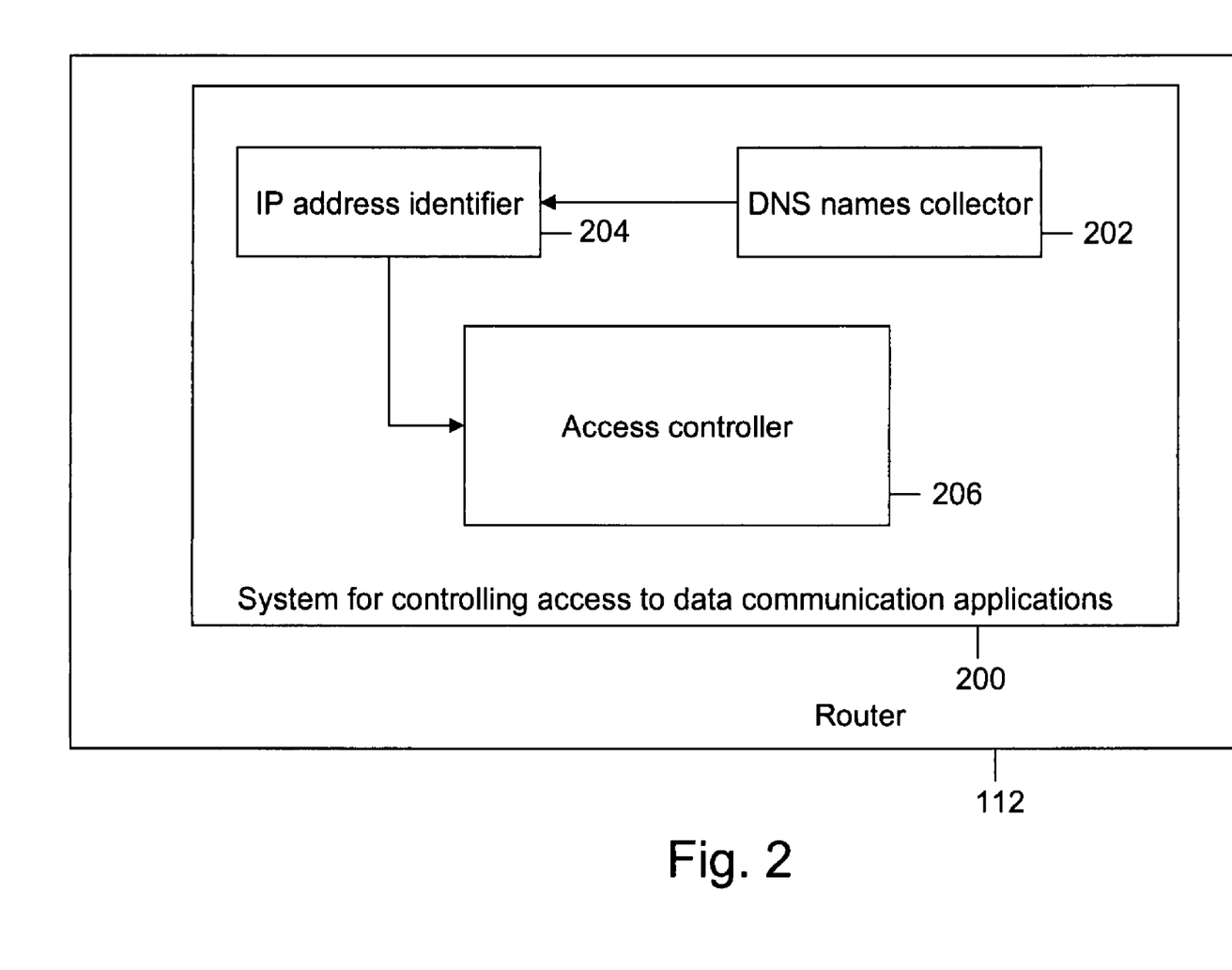
FIG. 2 illustrates a block diagram depicting a system for controlling access to various data communication applications in the network, in accordance with an exemplary embodiment of the invention.

FIG. 2 illustrates a block diagram depicting a system for controlling access to various data communication applications, hereinafter referred to as system 200, in network environment 100, in accordance with an exemplary embodiment of the invention. According to an embodiment of the invention, system 200 may include a DNS names collector 202, an IP address identifier 204, and an access controller 206. DNS names collector 202 can collect information about the domain name service (DNS) names of various data communication applications. For example, DNS names collector 202 can collect information about the DNS names of IM applications 116, 118, 120 and 122. In an embodiment of the invention, DNS names collector 202 can provide a command line interface (CLI) for an administrator of network environment 100, to enter the DNS names of the servers belonging to the data communication applications. A server of a data communication application can provide resources for running the data communication applications in their respective hosts. For example, IM server 124 provides resources for running IM applications, as described in relation with FIG. 1. In another embodiment of the invention, DNS names collector 202 can analyze IP requests generated by the data communication applications. The analysis can identify the DNS names of the servers of the data communication applications. According to one embodiment of the invention, DNS name collector 202 can communicate the information about DNS names to IP address identifier 204, which can identify IP addresses corresponding to the DNS names by executing DNS queries. After identifying the IP addresses, IP address identifier 204 can communicate this information to access controller 206. In accordance with an embodiment of the invention, access controller 206 can control access to the data communication applications for various requests that are going to the servers of the data communication applications. Requests for data transfer can be made through data communication applications in network environment 100. Access controller 206 can control the access, based on the identified IP addresses, by IP address identifier 204. In one embodiment of the invention, access controller 206 can determine the requests going to the servers of the data communication applications by using the identified IP addresses. In another embodiment of the invention, the requests going to the servers of the data communication applications can be made for data transfer through the data communication applications. Further, access controller 206 can restrict access to the data communication applications for the requests.

Figure 3:
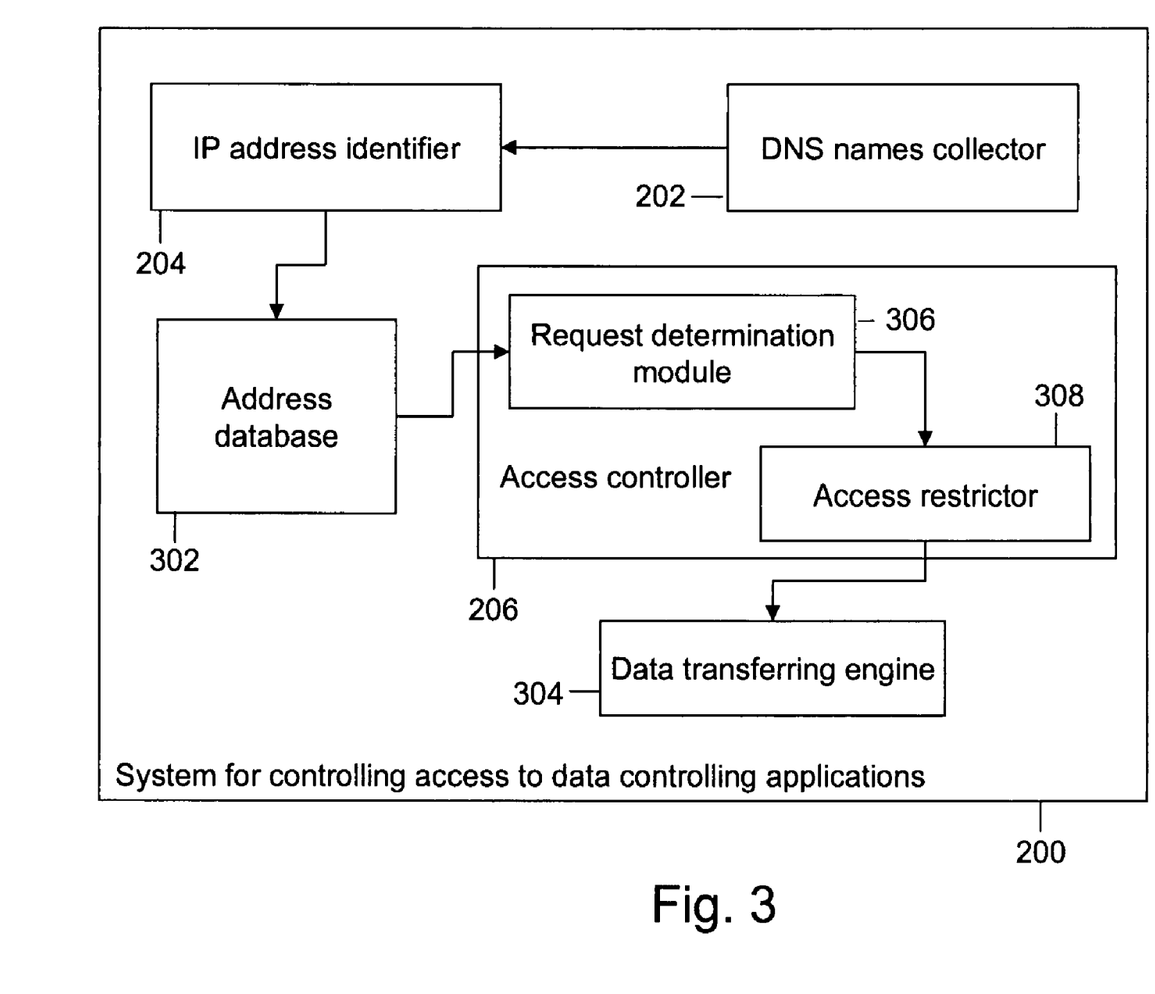
FIG. 3 illustrates a block diagram with a detailed description of different modules present in the system for controlling access to various data communication applications in the network, in accordance with an exemplary embodiment of the invention.

FIG. 3 illustrates a block diagram with a detailed description of different modules present in system 200 for controlling access to various data communication applications in network environment 100, in accordance with an exemplary embodiment of the invention. In an embodiment of the invention, system 200 can include DNS names collector 202, IP address identifier 204, an address database 302, and access controller 206. According to one embodiment of the invention, system 200 may also include a data transferring engine 304 for transferring requested data through the data communication applications. DNS names collector 202 can collect the information about the DNS names of the servers of the data communication applications. IP address identifier 204 can identify the IP addresses corresponding to these DNS names by executing the DNS queries. In an embodiment of the invention, IP address identifier 204 can communicate the IP addresses to address database 302, which can store the IP addresses. In accordance with an embodiment of the invention, access controller 206 can also include a request determination module 306 and an access restrictor 308. Request determination module 306 can determine the requests going to the servers of the data communication applications by consulting address database 302. Address database 302 can provide information about the IP addresses to request determination module 306, to determine requests that are going to the IM servers. Request determination module 306 can compare the destination IP address of a request with the addresses stored in the address database to determine whether the request is going to a server of a data communication application. Request permission module 306 can then query the access permission for the destination IP address matching in the address database. The requests that are going to the servers of the data communication applications can be made for data transfer through data communication applications. For example, request determination module 306 can determine the requests that are going to IM servers 124 and 126. After determining the requests and obtaining information about their access permissions, request determination module 306 can communicate this information to access restrictor 308, which can restrict access to the data communication applications for the requests. In one embodiment of the invention, access restrictor 308 can enforce a policy for the requests that are going to the servers of the data communication applications. In an embodiment of the invention, the policy can be a security policy, defined for a data communication application. Access restrictor 308 can communicate information about restricted access to the data communication applications. According to this information, data transferring engine 304 can transfer the requested data through the data communication applications to network 110. In an embodiment of the invention, data transferring engine 304 transfers the requested data corresponding to requests, for which the access is not restricted.

According to one embodiment of the invention, system 200 can be an additional utility in a router in the network. The router can have a firewall deployed and can control access to the data communication applications with the help of system 200.

Figure 4:
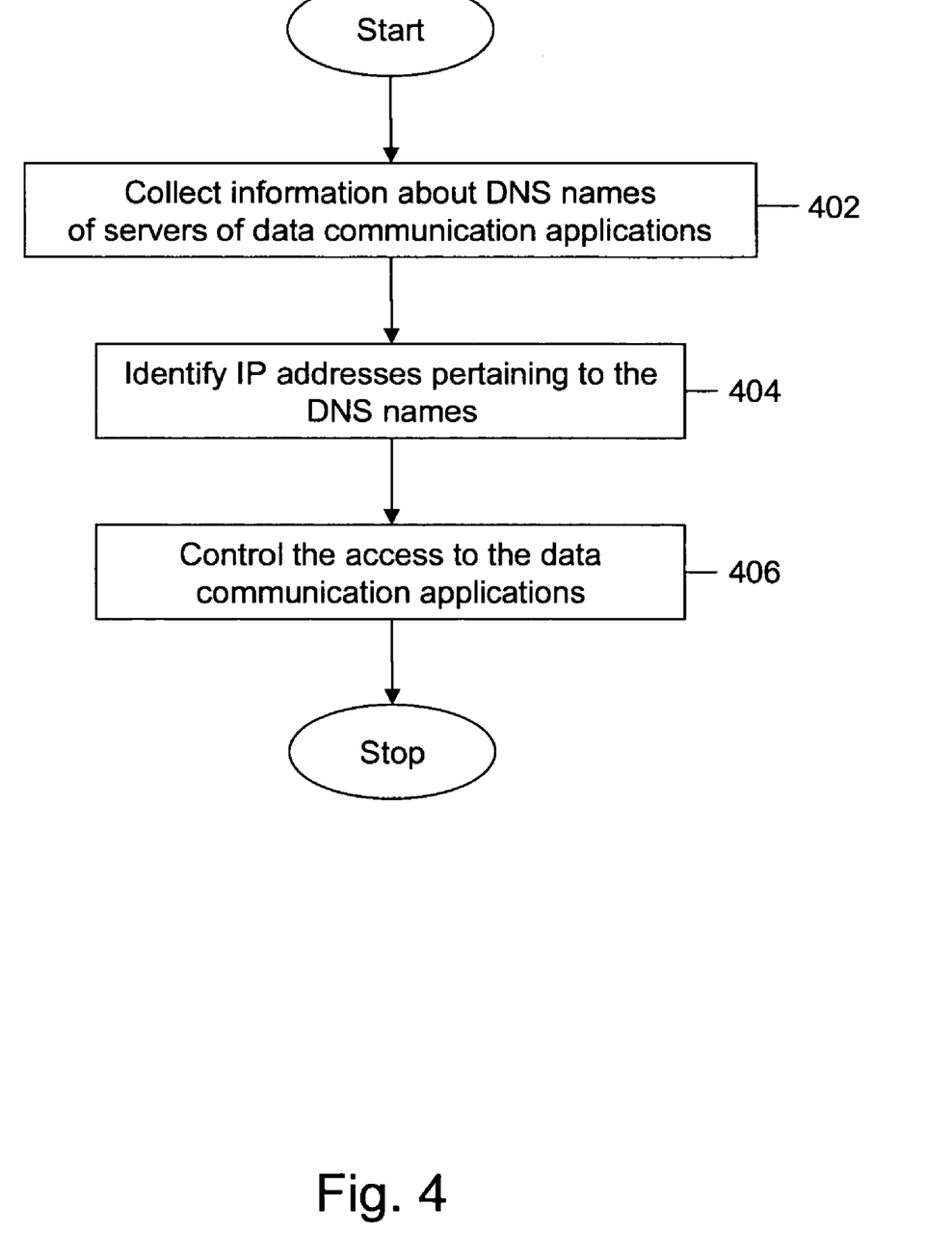
FIG. 4 illustrates a flowchart of a method for controlling access to various data communication applications in the network, in accordance with an exemplary embodiment of the invention.

FIG. 4 illustrates a flowchart of a method for controlling access to various data communication applications in network environment 100, in accordance with an exemplary embodiment of the invention. According to one embodiment of the invention, the data communication applications can be IM applications. In an embodiment of the invention, at step 402, information about the DNS names of the servers of the data communication applications can be collected. In an embodiment of the invention, this collection can be enabled by providing a mechanism such as a CLI. The administrator of network environment 100 can enter the DNS names of the servers by using the CLI. In another embodiment of the invention, the collection can be enabled by analyzing IP requests generated by the data communication applications. This analysis can identify the DNS names of the servers of the data communication applications. In an embodiment of the invention, this analysis can be made by comparing the DNS name in the DNS response packet relating to an IP request against a previously configured partial string. If there is a match, that DNS response packet is collected and the information about the DNS name is extracted. The collection of information about the DNS names can be carried out by DNS names collector 202. At step 404, IP addresses corresponding to the DNS names of the servers can be identified. In an embodiment of the invention, the identification of the IP addresses can be carried out by IP address identifier 204. After identifying the IP addresses, access to the data communication applications can be controlled for requests going to the servers of the data communication applications, at step 406. In accordance with one embodiment of the invention, access can be controlled by access controller 206, based on the identified IP addresses.

In accordance with an embodiment of the invention, access to the data communication applications can be controlled through a firewall deployed on a router. In accordance with another embodiment of the invention, the router can be configured according to the IP address of a DNS server in the network. For example, if a request for data transfer is made to host 106 through IM application 120, access to the IM application 120 can be controlled by a firewall deployed on router 114. Further, router 114 can be configured according to the IP address of DNS server 128.

Figure 5:
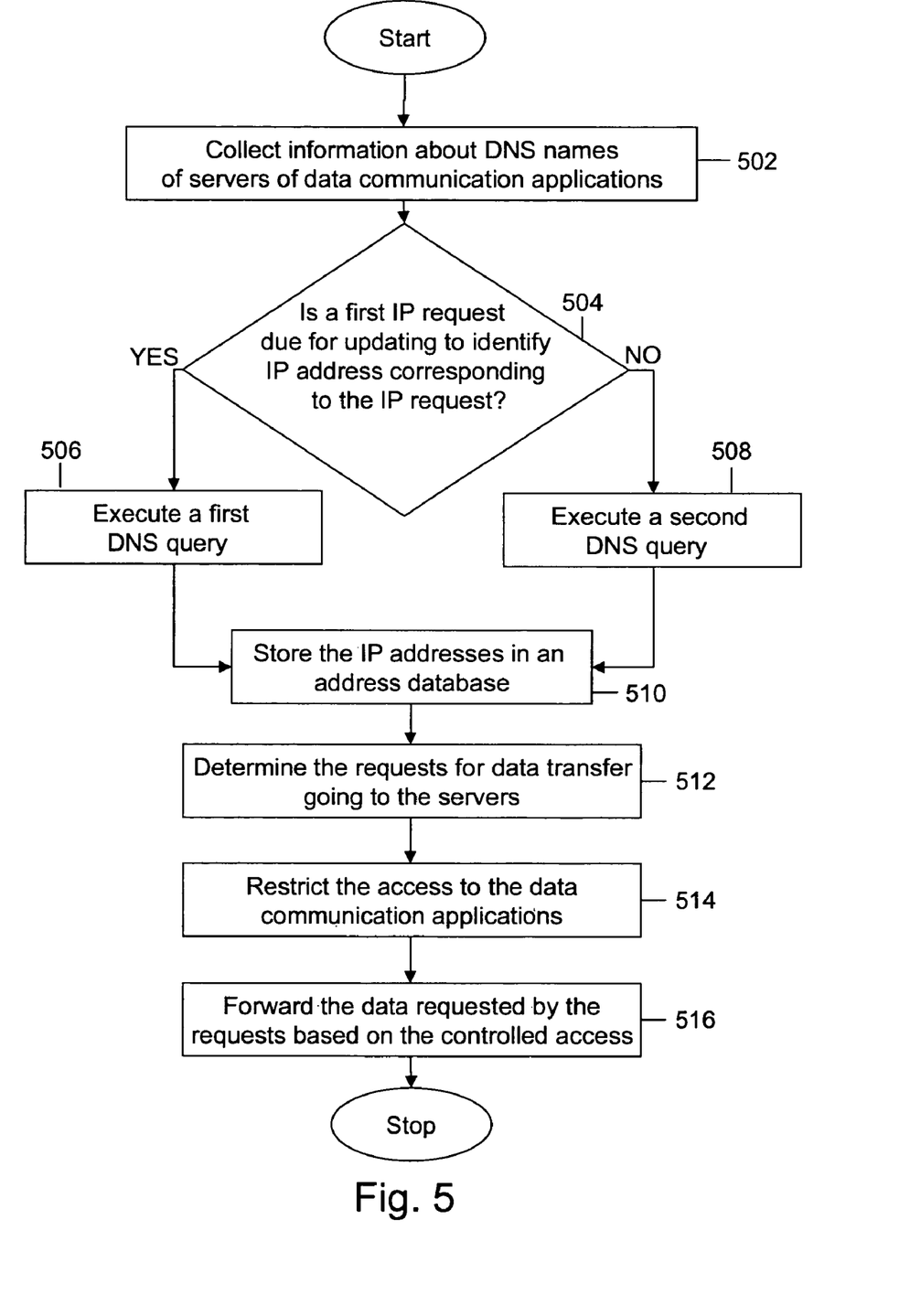
FIG. 5 illustrates a detailed flowchart of a method for controlling access to various data communication applications in the network, in accordance with an exemplary embodiment of the invention.

FIG. 5 illustrates a detailed flowchart of a method for controlling access to various data communication applications in network environment 100, in accordance with an exemplary embodiment of the invention. At step 502, information about the DNS names of the servers of the data communication applications can be collected. At step 504, a condition can be checked to determine whether a first IP request is due for updating. An IP request can be generated by a data communication application. In an embodiment of the invention, if the first IP request is due for updating, then a first DNS query can be executed at step 506, corresponding to the first IP request. The first DNS query can result in an IP address corresponding to the first IP request. In an embodiment of the invention, DNS queries can be made to DNS server 128, to identify the IP addresses corresponding to the DNS queries. In one embodiment of the invention, the DNS queries can be executed at regular intervals. In another embodiment of the invention, if the first IP request is not due for updating, then a second DNS query can be executed at step 508, corresponding to a second IP request. The second DNS query can result in an IP address corresponding to the second IP request. In one embodiment of the invention, after identifying the IP addresses corresponding to the IP requests made by the data communication applications, the identified IP addresses can be stored in an address database, at step 510. In an embodiment of the invention, the IP addresses can be stored in address database 302. In another embodiment of the invention, address database 302 can be refreshed after the response of each DNS query for a DNS name. The response of each DNS query for a DNS name informs about a validity interval. The validity interval is a time for which the response is valid. At the expiry of the validity interval, IP address generated from the DNS query can be automatically sent to update the address database. In one embodiment of the invention, at step 512, various requests going to the servers of the data communication applications are determined with the help of the identified IP addresses. These requests can pertain to transfer of data by the data communication applications. The destination IP address of a request can be compared with the IP addresses stored in the address database to determine if the request is going to a server of a data communication application. If a match is found in the address database, information about the access permissions for the destination IP address can also be queried at step 512. According to an embodiment of the invention, the requests and information about their access permissions can be determined by request determination module 306. At step 514, access restrictor 308 can take this information from the address database and restrict access to the data communication applications. In one embodiment of the invention, access can be restricted by enforcing a policy for the requests that are going to the data communication applications. The policy can be a security policy, defined for a data communication application. In an embodiment of the invention, the same security policy can be defined for all the data communication applications. In another embodiment of the invention, separate security policies can be defined for each of the data communication applications. After restricting access to the data communication applications, at step 516, the requested data can be transferred through the data communication applications. In an embodiment of the invention, the requested data is transferred, corresponding to requests for which access is not restricted. The transfer of data can be carried out by data transferring engine 304.

Embodiments of the invention provide the advantage that access to the data communication applications can be controlled, in spite of the dynamic IP addresses corresponding to each of the data communication applications. Embodiments of the invention have a mechanism that identifies all the IP addresses used by the data communication applications at regular intervals. Therefore, the router recognizes most of the IP addresses, and can control access to the data communication applications. The identification of all the IP addresses used by the servers of the data communication applications helps in managing access to the data communication applications through various IP addresses used by them. This also helps to block all the ports used by the servers of the data communication applications. Therefore, various embodiments of the invention avoid breaking firewalls deployed in the router by using various ports for data transfer.

Embodiments of the invention have the advantage that they can avoid additional access control lists (ACLs), to control access to data communication applications.

Although the invention has been discussed with respect to specific embodiments thereof, these embodiments are merely illustrative, and not restrictive, of the invention. For example, a 'method for managing communication of router information in a network' can include any type of analysis, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer-readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for controlling access to at least one data communication application in a network, the method comprising:
   collecting in a router coupled to the network, domain name service (DNS) names of at least one server of the at least one data communication application;
   identifying in the router, Internet Protocol (IP) addresses corresponding to the DNS names;
   storing the identified IP addresses in an address database;
   receiving a request in the router for access to the at least one data communication application; and
   controlling access to the data communication application based on a defined security policy for the data communication application, and in response to a destination IP address from the request matching at least one of the identified IP addresses stored in the address database to indicate that the request is intended for the server of the data communication application.

2. The method of claim 1, further comprising transferring data to satisfy the request when the destination IP address from the request mismatches each of the identified IP addresses stored in the address database.

3. The method of claim 1, wherein the data communication application comprises an instant messaging (IM) application.

4. The method of claim 1, further comprising controlling the access to the data communication application through a firewall deployed on the router in the network.

5. The method of claim 4, wherein the router is configured according to a plurality of IP addresses of a DNS server.

6. The method of claim 1, wherein the collecting the DNS names comprises providing a command line interface (CLI) for an administrator of the network to enter the DNS names of the server of the communication application.

7. The method of claim 1, wherein the collecting the DNS names further comprises analyzing one or more IP requests generated by the data communication application, the analysis determining the DNS names of the at least one server.

8. The method of claim 1, wherein the identifying the IP addresses corresponding to the DNS names comprises:
   executing a first DNS query pertaining to a first IP request if the first IP request is due for updating, the first DNS query resulting in a first IP address corresponding to the first IP request;
   executing a second DNS query pertaining to a second IP request if the first IP request is not due for updating, the second DNS query resulting in a second IP address corresponding to the second DNS query; and
   storing the first and second IP addresses in the address database.

9. The method of claim 8, wherein the executing the first and second DNS queries is performed at regular intervals.

10. The method of claim 8, wherein the address database is refreshed after a response of each DNS query.

11. The method of claim 1, wherein the controlling the access comprises:
    determining the request going to the server based on the identified IP addresses; and
    restricting the access to the server for the request.

12. The method of claim 1, further comprising defining a same security policy for each of the data communication applications.

13. A system for controlling access to one or more data communication applications in a network, the system comprising:
    a domain name service (DNS) names collector in a router coupled to the network, the DNS names collector being configured for collecting information about DNS names of one or more servers of the one or more data communication applications;
    an Internet Protocol (IP) address identifier for identifying in the router, the IP addresses corresponding to the DNS names;
    an address database for storing the identified IP addresses;
    a receiver for receiving a request in the router for access to the one or more data communication applications; and
    an access controller for controlling the access to the one or more data communication applications for a based on a defined security policy for the data communication application, and in response to a destination IP address from the received request matching at least one of the identified IP addresses stored in the address database to indicate that the request is intended for the one or more servers of the one or more data communication applications.

14. The system of claim 13, further comprising a data transferring engine for transferring data to satisfy the request when the destination IP address from the request mismatches each of the identified IP addresses stored in the address database.

15. The system of claim 13, wherein the data communication application comprises an instant messaging (IM) application.

16. The system of claim 13, wherein the DNS names collector further comprises a command line interface (CLI) for an administrator of the network to enter the DNS names of the one or more servers.

17. The system of claim 13, wherein the access controller further comprises:
    a request determination module for determining the request going to the one or more servers based on the identified IP addresses; and
    an access restrictor for restricting the access to the one or more servers for the request.

18. The system of claim 13, wherein the data communication application comprises an e-mail application.

19. A system for controlling access to one or more data communication applications in a network, the system comprising:
    means for collecting in a router coupled to the network, information about domain name service (DNS) names of one or more servers of the one or more data communication applications;

means for identifying in the router, Internet Protocol (IP) addresses corresponding to the DNS names;

means for storing the identified IP addresses in an address database;

means for receiving a request in the router for access to the one or more data communication applications; and means for controlling the access to the one or more data communication applications based on a defined security policy for the data communication application, and in response to a destination IP address from the received request matching at least one of the identified IP addresses stored in the address database to indicate that the request is intended for the one or more servers of the one or more data communication applications.

20. A computer-readable storage medium including instructions executable by a processor, the storage medium comprising:

one or more instructions for collecting information about domain name service (DNS) names of one or more servers of one or more data communication applications;

one or more instructions for identifying Internet Protocol (IP) addresses corresponding to the DNS names;

one or more instructions for storing the identified IP addresses in an address database;

one or more instructions for receiving a request for access to the one or more data communication applications; and one or more instructions for controlling access to the one or more data communication applications based on a defined security policy for the data communication application, and in response to a destination IP address from the received request matching at least one of the identified IP addresses stored in the address database to indicate that the request is intended for the one or more servers of the one or more data communication applications.

21. An apparatus for controlling access to one or more data communication applications in a network, the apparatus comprising:

a processor for executing instructions;

a computer-readable storage medium including instructions executable by the processor, the storage medium comprising:

one or more instructions for collecting information about domain name service (DNS) names of one or more servers of the one or more data communication applications;

one or more instructions for identifying Internet Protocol (IP) addresses corresponding to the DNS names;

one or more instructions for storing the identified IP addresses in an address database;

one or more instructions for receiving a request for access to the one or more data communication applications; and one or more instructions for controlling access to the one or more data communication applications based on a defined security policy for the data communication application, and in response to a destination IP address from the received request matching at least one of the identified IP addresses stored in the address database to indicate that the request is intended for the one or more servers of the one or more data communication applications.

\* \* \* \* \*